April 26, 1960
R. C. PUCKETT ET AL
2,933,817
RIVET AND BOLT GAGE
Filed June 19, 1957
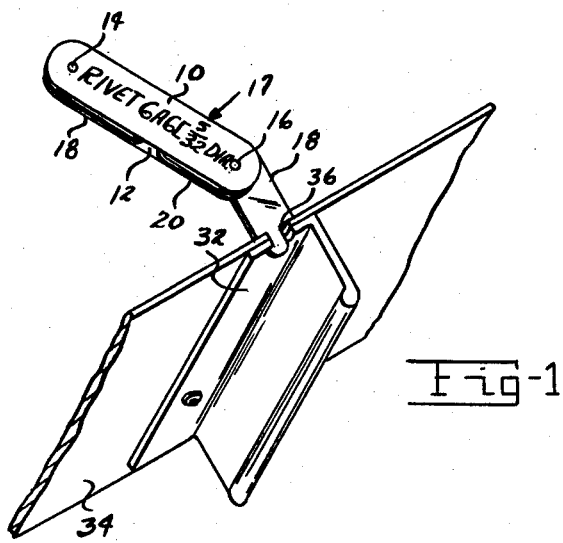
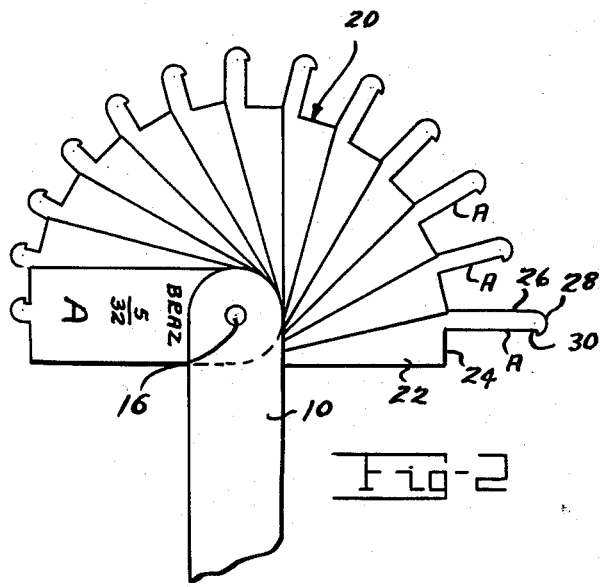
INVENTORS
RALPH C. PUCKETT
JOHN T. O'TOOLE
BY
ATTORNEY

United States Patent Office 2,933,817
Patented Apr. 26, 1960

2,933,817
RIVET AND BOLT GAGE

Ralph C. Puckett, Dayton, and John T. O'Toole, New Carlisle, Ohio

Application June 19, 1957, Serial No. 666,793

1 Claim. (Cl. 33—168)

(Granted under Title 35, U.S. Code (1952), sec. 266)

The invention described herein may be manufactured and used by or for the United States Government for governmental purposes without payment to us of any royalty thereon.

The present invention relates to a rivet and bolt gage and, more particularly, to a device for determining the diameter and shank length of the rivet or bolt required for a particular application.

In many situations, the present considerations being applied more particularly to aircraft, the location of the rivet or bolt makes access by any standard measuring means impossible. Also in situations where tapering panels are used, many different lengths of rivet shanks are required. Furthermore, in precision installations, variations in the rivet lengths or bolt lengths necessary for a specified use are so slight that determination by other than precision means is impossible.

The present invention has for its object the provision of a precision device for measuring the thickness of a panel or panels for determining the diameter and shank length of a rivet or bolt fastening required for a particular job.

A further object of the invention is the provision of a device for measuring panel thickness in locations inaccessible to measuring instruments now available.

A further object of the invention is the provision of a compact tool for the purposes above described, which resembles a jack knife, having a plurality of measuring stems or blades which fold within a case or handle when not in use.

Further objects and advantages will appear as the description proceeds.

In the drawing:

Fig. 1 is a perspective view of the device shown in the process of measuring the thickness of a panel and bracket to be attached thereto.

Fig. 2 is a plan view of the device with the measuring elements fanned out for purposes of display.

Referring more particularly to the drawing: A pair of plates 10 and 12 are secured together in spaced and parallel relationship by means of pins 14 and 16. The plates 10 and 12 function both as a handle for the device and as an enclosing casing 17 for the measuring blades 18 and 20.

There are two sets of measuring blades 18 and 20, one set being pivoted at 14 and the other set pivoted at 16, at opposite ends of the casing 17 so that they can be folded together to nest between the plates 10 and 12.

Each blade 20 has a body portion 22, which is pivoted between the plates 10 and 12 by means of the pivot pin 16 and terminates in a shoulder portion 24. A stem or shank portion 26 is provided with a semicircular tip portion 28, which forms a shoulder 30 with the stem 26. The length A, measured by the distance between the shoulders 24 and 30 represent the calibration of the particular blade and this indication is marked on the blade. Each blade in the particular tool is exactly like all of the other blades except for this length, which differs. The diameters represented by the ends 30 in this tool are identical, and can conceivably be marked on the tool.

Fig. 1 shows the device in operation. An angle bracket 32 is to be secured to the panel 34. Coinciding rivet holes 36 have been made in the members 32 and 34. The problem at hand is to select the proper size rivet or bolt for the job.

Conceivably, there are several such tools in a set, differing in the size of the diameters of the semicircular tip portions 28. The tool selected will be the one whose tip portions 28 will pass through the hole 36. When this selection is made, the determination of the rivet or bolt size has also been determined. This having been done, the next step is to successively try the blades 22 until one is found whose distance A matches the combined thickness of the elements 32 and 34. The operator soon learns the feel of the fit of the shoulders 24 and 30 against the outer walls of the members 32 and 34 and the legend or indicia such as 5/32 shown on the left-hand blade of Fig. 2, indicates the length of the stem or shank and shows the operator the length of rivet or bolt he will need for this job. Custom fits are thus assured for each job.

While the invention is shown and described in connection with one form for illustrative, rather than restrictive purposes, it is obvious that changes and modifications may be made by those skilled in the art without departing from the scope and spirit of the invention as defined in the accompanying claim.

We claim:

A tool for measuring panel thickness and hole diameters in paneling where access is available from one side only of the paneling, said tool comprising a pair of outer plates, means located adjacent both ends of said plates for securing said plates in spaced parallel relationship, two sets of measuring blades, each of said blades comprising a body portion, a semicircular tip portion, and a shank portion located intermediate said body and semicircular tip portions, each of said sets being pivotally mounted between an opposite end of said outer plates, said blades being secured by the body portion thereof so as to permit rotation of the individual blades of each set about said securing means, said semicircular tip portions all having a diameter corresponding to a single selected hole diameter, said shank portions being centered on said blades and having a width which is less than said semicircular tip diameter, the length of said shank portions increasing by increments from one blade to the next in each set, said body portions having a width greater than said semicircular tip diameter, said shank, semicircular tip and body portions defining first, second and third stop shoulders, said shank and semicircular tip portions defining said first stop shoulders, and shank and body portions defining said second and third stop shoulders whereby said second and third stop shoulders are on opposite sides of said shank and are wider than said first stop shoulder, and said first and second stop shoulders are on the same side of said shank, the separation between said first and second stop shoulders thereby defining the thickness measuring unit of each blade, and the diameter of said semicircular tip portions comprising the hole diameter determining means of each tool.

References Cited in the file of this patent

UNITED STATES PATENTS

| | | |
|---|---|---|
| 867,011 | Bromley | Sept. 24, 1907 |
| 1,209,711 | Jacoby | Dec. 26, 1916 |